(12) United States Patent
Morgner (10) Patent No.: US 11,008,168 B2
(45) Date of Patent: May 18, 2021

(54) STORAGE DEVICE FOR FIBER MATERIAL COMPRISING A CLEANING UNIT

(71) Applicant: TEMAFA Maschinenfabrik GmbH, Bergisch Gladbach (DE)

(72) Inventor: Joerg Morgner, Kuerten (DE)

(73) Assignee: TEMAFA Maschinenfabrik GmbH, Bergisch Gladbach (DE)

(*) Notice: Subject to any disclaimer, the term of this patent is extended or adjusted under 35 U.S.C. 154(b) by 85 days.

(21) Appl. No.: 16/270,064

(22) Filed: Feb. 7, 2019

(65) Prior Publication Data

US 2019/0241365 A1 Aug. 8, 2019

(30) Foreign Application Priority Data

Feb. 8, 2018 (DE) ...................... 10 2018 102 860.1

(51) Int. Cl.
*F26B 7/00* (2006.01)
*B65G 3/04* (2006.01)
(Continued)

(52) U.S. Cl.
CPC .................. *B65G 3/04* (2013.01); *B08B 9/08* (2013.01); *D01G 23/02* (2013.01)

(58) Field of Classification Search
CPC ........ D01G 23/02; D01G 23/00; D01G 23/04; D01G 23/08; B65G 3/04; B08B 9/08; B01D 46/00; B01D 46/0019; B01D 46/12
(Continued)

(56) References Cited

U.S. PATENT DOCUMENTS

| 2,253,698 A | 8/1941 | Goldsmith |
| 3,486,309 A | 12/1969 | Wild |

(Continued)

FOREIGN PATENT DOCUMENTS

| DE | 78 03 047 U1 | 7/1982 |
| DE | 33 15 940 A1 | 11/1984 |

(Continued)

OTHER PUBLICATIONS

EPO Search Report, dated Aug. 19, 2019.
German Patent Office Search Report, dated Oct. 11, 2018.

*Primary Examiner* — John P McCormack
(74) *Attorney, Agent, or Firm* — Dority & Manning, P.A.

(57) ABSTRACT

A fiber material storage device for a textile includes a storage chute having a chute housing and a supply line leading into the storage chamber. Fiber material is pneumatically conveyed with conveying air into the storage chamber. A cleaning unit in the storage chamber cleans contamination from the conveying air and includes a cleaning chamber. A semipermeable dividing wall is situated between the storage chamber and the cleaning chamber to retain the fiber material in the storage chamber and allow the contaminated conveying air to flow into the cleaning chamber. A filter element is situated in the conveying air flow between the cleaning chamber and outer surroundings to retain the contamination in the cleaning chamber and allow filtered conveying air to escape into the surroundings. The cleaning housing has a collection chamber situated underneath the cleaning chamber, wherein the contamination retained by the filter element settles in the collection chamber.

9 Claims, 5 Drawing Sheets

(51) Int. Cl.
*D01G 23/02* (2006.01)
*B08B 9/08* (2006.01)

(58) Field of Classification Search
USPC ........... 34/292, 300, 480, 306; 406/168, 171
See application file for complete search history.

(56) References Cited

U.S. PATENT DOCUMENTS

| | | | | |
|---|---|---|---|---|
| 4,199,333 | A | * | 4/1980 | Ferri ..................... B01D 46/26 |
| | | | | 55/290 |
| 4,219,289 | A | | 8/1980 | Trutzschler |
| 2004/0003485 | A1 | * | 1/2004 | Hosel ..................... D01G 15/34 |
| | | | | 19/105 |

FOREIGN PATENT DOCUMENTS

| | | |
|---|---|---|
| DE | 39 04 853 A1 | 8/1990 |
| DE | 10 2008 058 254 A1 | 5/2010 |
| EP | 2 028 297 A2 | 2/2009 |
| FR | 1 498 901 A | 10/1967 |
| GB | 1 133 063 A | 11/1968 |
| GB | 2 465 468 A | 5/2010 |
| JP | H02 106472 U | 8/1990 |
| WO | WO 2006/086911 A1 | 8/2006 |

* cited by examiner

STORAGE DEVICE FOR FIBER MATERIAL COMPRISING A CLEANING UNIT

FIELD OF THE INVENTION

The present invention relates to a storage device for a device for preparing and/or feeding fiber material, in particular, for web manufacturing. The device includes a storage chute for the interim storage of fiber material, which includes a chute housing comprising a storage chamber and a supply line leading into the storage chamber, via which the fiber material can be pneumatically conveyed with the aid of conveying air into the storage chamber. A cleaning unit for cleaning the contaminated conveying air is situated in the storage chamber, which comprises a cleaning housing including a cleaning chamber. A semipermeable dividing wall is situated in the conveying air flow between the storage chamber and the cleaning chamber, which retains the fiber material in the storage chamber and allows the contaminated conveying air to flow into the cleaning chamber. The cleaning unit has a filter element situated in the conveying air flow between the cleaning chamber and the surroundings, via which the contamination in the conveying air can be retained in the cleaning chamber and the filtered conveying air can escape into the surroundings. Moreover, the invention relates to a device for preparing and/or feeding fiber material for a textile installation comprising a storage device of this type.

BACKGROUND

FR 1.498.901 A describes a storage device for fiber material, which comprises a storage chute for storing the fiber material. The storage device includes a semipermeable dividing wall between a chute housing of the storage chute and a cleaning housing of a cleaning unit. The dividing wall retains the fiber material in the storage chamber and allows the contaminated conveying air to flow into the cleaning chamber. It is disadvantageous in this case that the entire conveying air volume has to be extracted. For this reason, a large amount of energy is required for cleaning the conveying air, whereby the process of cleaning the air and operating this installation is very expensive.

A problem addressed by the present invention is therefore that of creating a storage device as well as a device comprising a storage device of this type, with the aid of which the cleaning of the conveying air can take place in an energy-efficient and, therefore, cost-effective manner.

SUMMARY

The problem is solved by a storage device, as well as a device comprising a storage device of this type having the features set forth herein. Additional objects and advantages of the invention will be set forth in part in the following description, or may be obvious from the description, or may be learned through practice of the invention.

The invention relates to a storage device for a device for preparing and/or feeding fiber material, in particular, for web manufacturing. The storage device comprises a storage chute for the interim storage of fiber material, which includes a chute housing comprising a storage chamber and a supply line leading into the storage chamber, via which the fiber material can be pneumatically conveyed with the aid of conveying air into the storage chamber. Moreover, the storage device comprises a cleaning unit for cleaning the contaminated conveying air situated in the storage chamber. The cleaning unit comprises a cleaning housing including a cleaning chamber. The storage device also comprises a semipermeable dividing wall. The dividing wall is situated in the conveying air flow of the conveying air between the storage chamber and the cleaning chamber. The semipermeable dividing wall is designed in such a way that the dividing wall retains the fiber material in the storage chamber and allows the contaminated conveying air to flow into the cleaning chamber. As a result, a separation of the fibers from the contaminated conveying air can take place via the dividing wall. The term "contamination" is to be understood to mean, in particular, dust, microdust, and larger foreign particles. The contamination can also include superfine fibers or fiber particles of the fiber material.

Moreover, the cleaning unit comprises a filter element situated in the conveying air flow between the cleaning chamber and the surroundings. By way of the filter element, contamination in the conveying air can therefore be retained in the cleaning chamber. The filtered conveying air, on the other hand, can escape into the surroundings via the filter element. Advantageously, the flow energy of the conveying air is therefore utilized for enabling the conveying air to pass through the filter element. As a result, an exhaust installation for extracting the conveying air through the filter element can be dispensed with. A better part of the conveying air can therefore be conveyed through the filter element without requiring any additional energy. The cleaning unit can therefore be operated highly energy-efficiently and, therefore, cost-effectively.

The cleaning housing comprises, at the bottom thereof, a collection chamber in order to be able to ensure that the cleaning unit remains ready for operation for as long as possible and to minimize the amount of effort required to maintain the cleaning unit. The collection chamber is situated beneath the cleaning chamber. Advantageously, the contamination retained by the filter element in the cleaning chamber therefore autonomously settles in the collection chamber due to the force of gravity. As a result, it can be ensured that a better part of the contamination autonomously drops off the filter element and, therefore, is transported out of the conveying air flow. As a result, the conveying air flow can pass through the filter element, unobstructed, for a longer time. The aforementioned storage device can therefore be operated highly cost-effectively with little maintenance effort.

It is advantageous when the collection chamber includes a disposal opening leading out of the cleaning housing. The contamination settling in the collection chamber can therefore be removed from the collection chamber via this disposal opening. Preferably, the contamination is conveyed out of the collection chamber via the disposal opening into a waste container. In one advantageous refinement of the invention, the disposal opening is preferably formed on the side of the collection chamber.

The disposal of the contamination from the collection chamber can take place in a highly space-saving manner when the disposal opening is located on a first collection chamber wall of the collection chamber.

It is also advantageous when the cleaning unit comprises an, in particular, mechanical or pneumatic, transport unit, with the aid of which the contamination can be removed from the collection chamber via the disposal opening.

Preferably, the pneumatic transport unit is designed in such a way that it exhausts or blows a disposal air flow through the disposal opening. The pneumatic transport unit is preferably designed in such a way that it generates a disposal air flow flowing in the direction of the disposal opening, with the aid of which the contamination settling in the collection chamber can be released and/or extracted out of the disposal opening. Advantageously, the pneumatic transport unit can therefore be operated highly cost-efficiently, since it only needs to remove a small portion of the conveying air of the conveying air flow through the disposal opening. The better part of the conveying air, on the other hand, is passively released via the filter element, as explained above, wherein the conveying air flow of a transport device, which blows the fiber material into the chute housing via the supply line, is utilized for this purpose.

It is advantageous when the pneumatic transport unit comprises at least one blow opening, via which the disposal air flow can be introduced into the collection chamber. The direction of the disposal air flow can be advantageously influenced via the blow opening. The blow opening can be a conventional opening in a base and/or a wall. Alternatively, it is even conceivable, however, that the blow opening is designed as a nozzle.

It is advantageous when the at least one blow opening is oriented relative to the disposal opening in such a way that a disposal air flow oriented and/or directed in the direction of the disposal opening can be generated. As a result, the removal of the contamination via the disposal opening can be designed to be highly energy-efficient.

In one advantageous enhanced embodiment, the at least one blow opening is located on a second collection chamber wall which, in particular, is positioned opposite the first collection chamber wall. As a result, it is ensured that the disposal air flow is blown out of the blow opening and in the direction of the disposal opening.

Additionally or alternatively, it is advantageous when at least one blow opening is located on a collection chamber base of the collection chamber. As a result, the situation can be prevented in which contamination is not captured by the disposal air flow and remains fixed on the collection chamber base.

In one advantageous enhanced embodiment of the invention, the collection chamber base is slanted at least in a first section. Additionally or alternatively, the collection chamber base can extend obliquely in the first section toward the disposal opening.

It is also advantageous when the collection chamber base, additionally or alternatively, extends horizontally in a second section. Thus, the collection chamber base can be designed, for example, in such a way that, originating from the disposal opening, the collection chamber base initially extends horizontally and, thereafter, rises obliquely.

It is advantageous when the pneumatic transport unit comprises a plurality of blow openings. In this case, at least one blow opening is preferably located on a collection chamber wall and/or at least one blow opening is located on the collection chamber base.

The blow openings can be designed in a highly cost-effective manner when the collection chamber base is formed, at least in one section, from a perforated plate comprising a plurality of blow openings.

Additionally or alternatively, it is advantageous when the collection chamber base comprises at least one step. The step preferably points in the direction of the disposal opening. This means, at least one end face of the step is oriented in the direction of the disposal opening. The stepped collection chamber base therefore drops, in steps, in the direction of the disposal opening. Additionally or alternatively, it is advantageous when at least one blow opening is formed in the step. The blow opening is therefore preferably formed in the end face of the step that points in the direction of the disposal opening.

In this regard, it is furthermore advantageous when the collection chamber base is stepped in the direction of the disposal opening by way of multiple steps arranged one behind the other. As a result, it can be ensured that blow openings are formed at different points in the longitudinal direction of the collection chamber base. Preferably, these blow openings are formed in the particular step levels.

It is advantageous when the pneumatic transport unit comprises a ventilator for generating the disposal air flow. The ventilator is preferably designed as a blower. The ventilator therefore draws air from the surroundings and blows the air, as a disposal air flow, into the cleaning housing.

The blower ventilator is preferably operatively connected to the at least one blow opening. This takes place, in particular, via an air supply chamber formed on the back side of the second collection chamber wall and/or on the back side of the collection chamber base. Consequently, the ventilator draws air from the surroundings and introduces it into the air supply chamber. Via the air supply chamber, the air is distributed to the blow opening, from which the air emerges, as a disposal air flow, from the at least one blow opening. The disposal air flow emerging from the at least one blow opening carries the contamination along and removes the contamination from the collection chamber through the disposal opening.

It is advantageous when the ventilator and the disposal opening are situated on two opposite sides of the cleaning housing.

It is also advantageous when the collection chamber tapers in the shape of a funnel, at least in one section, in the direction of the collection chamber base. As a result, the contamination settling due to the force of gravity is guided toward the collection chamber base.

In an alternative embodiment, the transport unit can even be designed as a mechanical transport unit, wherein the transport unit then preferably comprises a motor-driven conveyor belt, which preferably forms at least one portion of the collection chamber base. The conveyor belt is situated with respect to the disposal opening in such a way that the contamination can be transported out of the disposal opening via the conveyor belt.

In one advantageous enhanced embodiment of the invention, the dividing wall is a perforated plate. It is also advantageous when the dividing wall forms at least one portion of a common side wall of the chute housing and of the cleaning housing. The chute housing and the cleaning housing are therefore situated directly adjacent to one another, and so they share one side wall. The dividing wall is preferably formed by this common side wall.

It is advantageous when the chute housing comprises a lower storage chamber, in which the fibers conveyed through the supply line can settle and can be stored there. Additionally, it is advantageous when the chute housing comprises a supply chamber, which is situated above the storage chamber. In the supply chamber, the fiber material is mixed with the conveying air, and so the fiber material is whirled. The dividing wall is preferably situated in the area of the supply chamber.

It is advantageous when the filter element is situated on an outer wall, which is positioned, in particular, opposite the dividing wall of the cleaning housing, in particular, of the cleaning chamber and/or at least partially forms the outer wall. As a result, the conveying air can be immediately released into the surroundings as soon as it has passed through the filter element, which, in this case, forms at least one portion of the outer wall of the cleaning housing. The filter element is therefore advantageously designed as a filter wall and/or a filter outer wall, which preferably forms at least one portion of the housing wall of the cleaning housing.

One further advantage is that the filter element can therefore be easily cleaned. It may happen that a portion of the contamination remains fixed to the inner side of the filter element. A jet of cleaning air can therefore be blown, from the outside toward the inside, through the filter element forming at least one portion of the outer wall, and so the inside of the filter element can be cleared once again. The released contamination can therefore settle in the collection chamber due to the force of gravity.

It is advantageous when the material of the filter element is a metal, a plastic, and/or a textile made, in particular, from natural or synthetic fibers.

Preferably, the filter element is formed from paper, a metal fabric, a metal mesh, and/or an, in particular, metallic plate including microholes. The term "microholes" is to be understood to mean holes which can retain dust particles in the air and/or are smaller, in particular, by a multiple thereof, than the holes in the dividing wall formed as a perforated plate.

In one advantageous enhanced embodiment of the invention, the storage device comprises two cleaning units which are situated, in particular, symmetrically with respect to one another and/or opposite one another. The two cleaning units are preferably designed according to the preceding description, wherein the aforementioned features can be present individually or in any combination. Preferably, the particular cleaning chambers of the two cleaning units are separated from the common storage chamber via a separate dividing wall.

The invention furthermore relates to a device for preparing and/or feeding fiber material for a textile installation, in particular, for web manufacturing, which comprises a storage device for the interim storage of the fiber material. The storage device is designed according to the preceding description, wherein the mentioned features can be present individually or in any combination. As a result, the cleaning of the conveying air can take place in a highly energy-efficient manner.

It is advantageous when the device is an opener for opening the fiber material. In this case, the device is mixing opener and/or a fine opener. Additionally or alternatively, it is advantageous when the device is a feeder, with the aid of which the fiber material can be fed to a machine positioned downstream from the device, in particular, a carding machine and/or a card.

In this regard, it is advantageous when the device includes a feed roller, a delivery roller, and/or an opening roller positioned downstream from the storage device in the direction of material flow.

BRIEF DESCRIPTION OF THE DRAWINGS

Further advantages of the invention are described in the following exemplary embodiments. Wherein.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
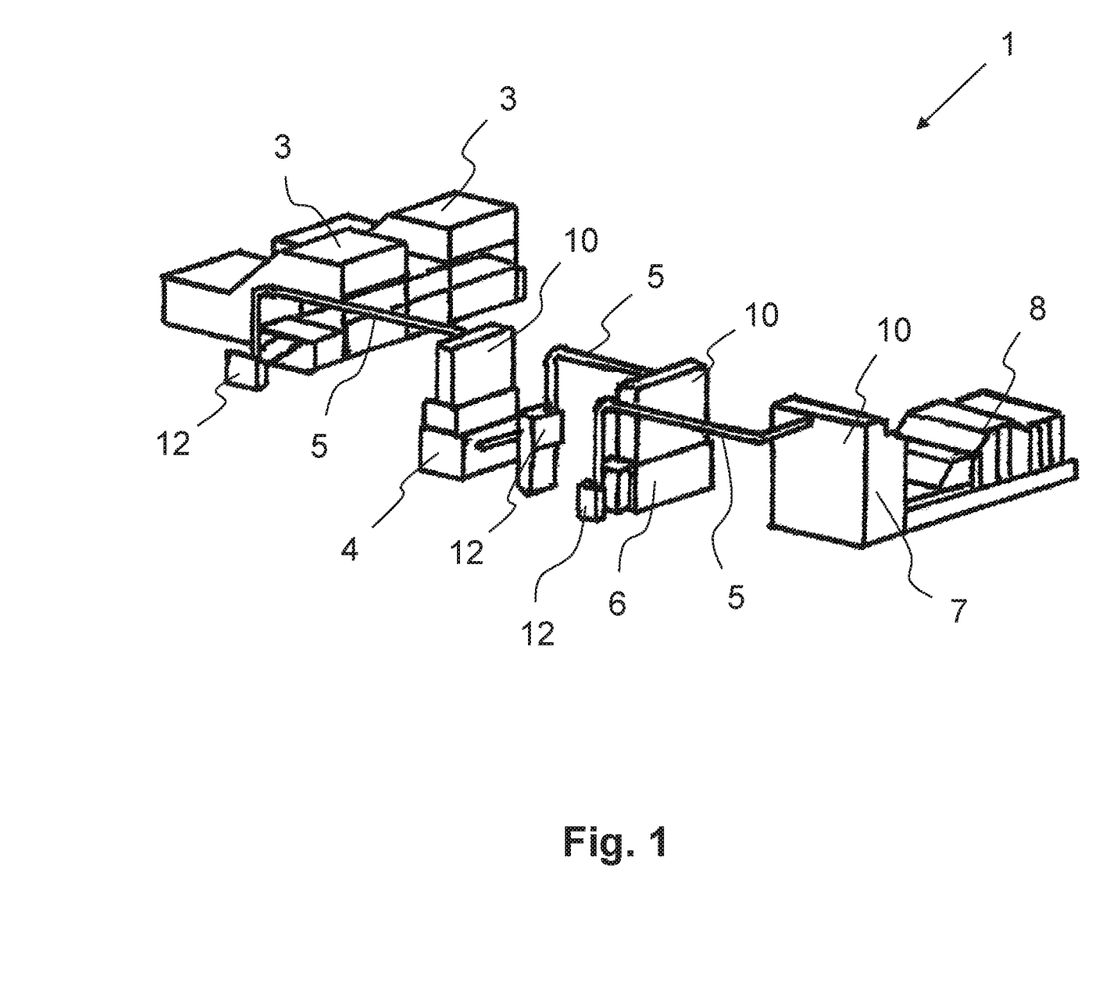
FIG. 1 shows a schematic representation of a perspective view of a textile installation for web manufacturing.
Figure 2A:
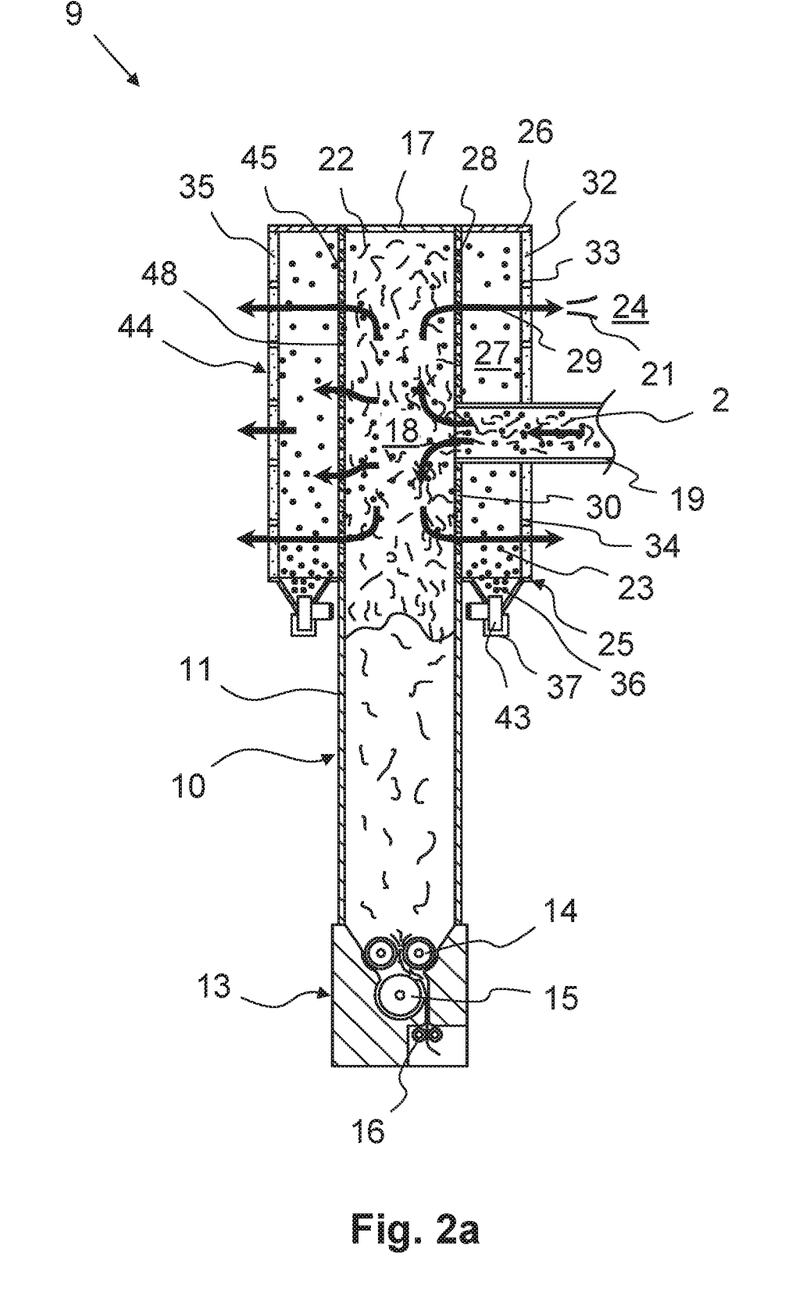
FIG. 2*a* shows a side cutaway view of a device for preparing and/or feeding fiber material, comprising a storage device including a cleaning unit.
Figure 2B:
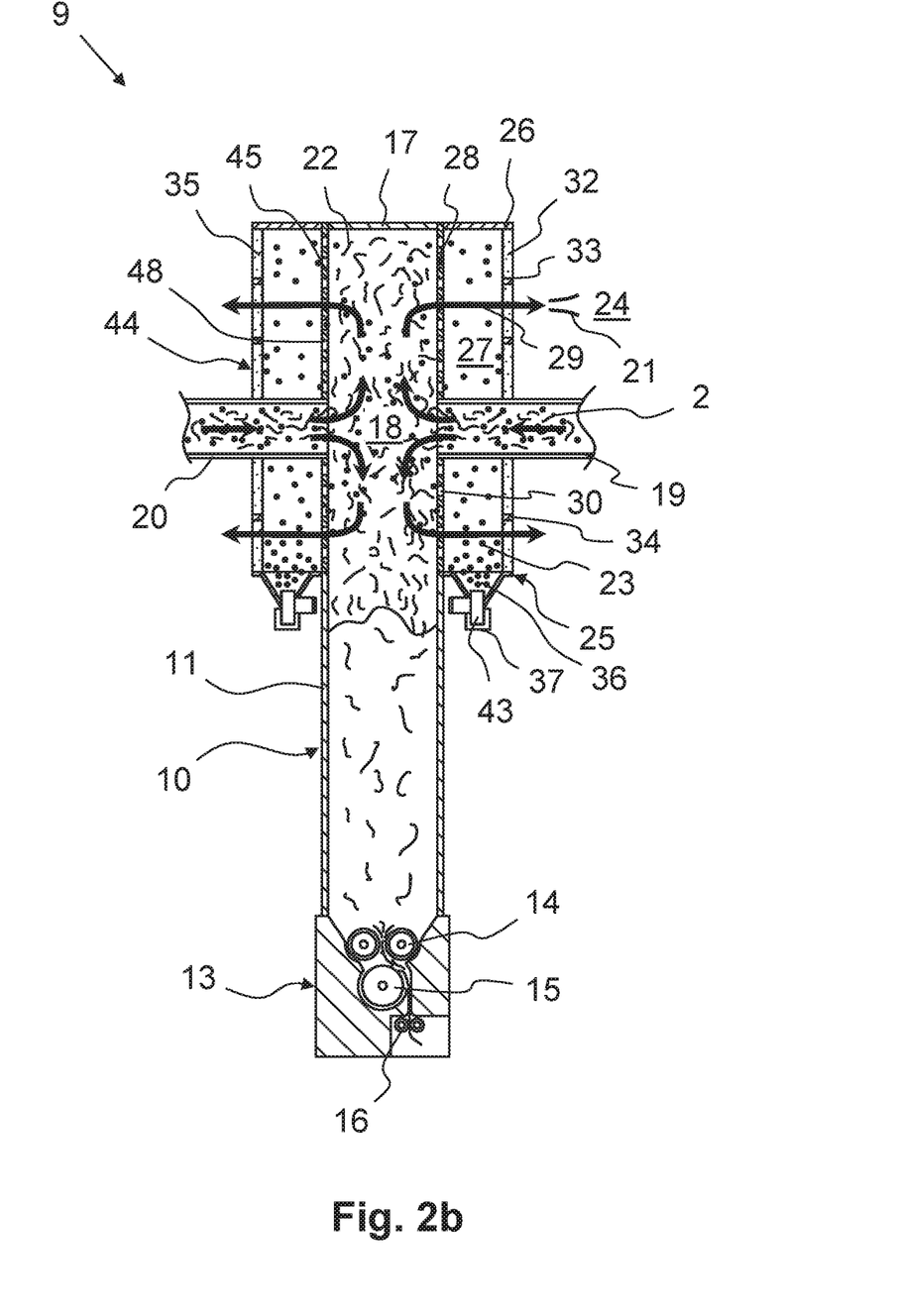
FIG. 2*b* shows a side cutaway view of a device for preparing and/or feeding fiber material, comprising two supply lines for fiber material.

FIG. 1 shows an exemplary embodiment of a textile installation 1 which, in this case, is designed for web manufacturing. The fiber material 2 (FIG. 2), which is presented in the form of bales, is opened with the aid of bale openers 3 and is dropped onto a transport belt. Thereafter, the opened fiber material 2 is fed via a pipeline 5 to a mixing opener 4, by way of which the fiber material is subjected to a first opening and further blending. From the mixing opener 4, the fiber material 2 is routed via a further pipeline 5 into a fine opener 6, in which the fiber material 2 is subjected to fine opening. Via a third pipeline 5, the fiber material finally enters a feeding chute feeder 7, from which a carding machine 8 is fed. The conveyance of the fiber material 2 through the pipelines 5 takes place with the aid of at least one pneumatic conveying device 12, which generates a conveying air flow 29 using a blower.

The mixing opener 4, the fine opener 6, as well as the feeding chute feeder 7, are exemplary embodiments of a device 9, for preparing and/or feeding the fiber material 2, which is described in detail in the following. A detailed view of this device 9 is shown in FIGS. 2 and 3.

According to FIG. 1, the mixing opener 4, the fine opener 6, and the feeding chute feeder 7 each comprise a storage device 10 including a storage chute 11 (FIG. 2), which, in the side view, in particular, is narrow and tall. Due to the great overall height of the storage chutes 11 required for a sufficiently great reserve volume, space is saved on the bottom surface. The storage chutes 11 of these devices 4, 6, 7 act as buffers for the purpose of compensating for fluctuations in the supply via the bale openers 3, the downstream openers, in particular via the mixing opener 4 and/or the fine opener 6, and/or the feeding chute feeder 7.

Figure 3:
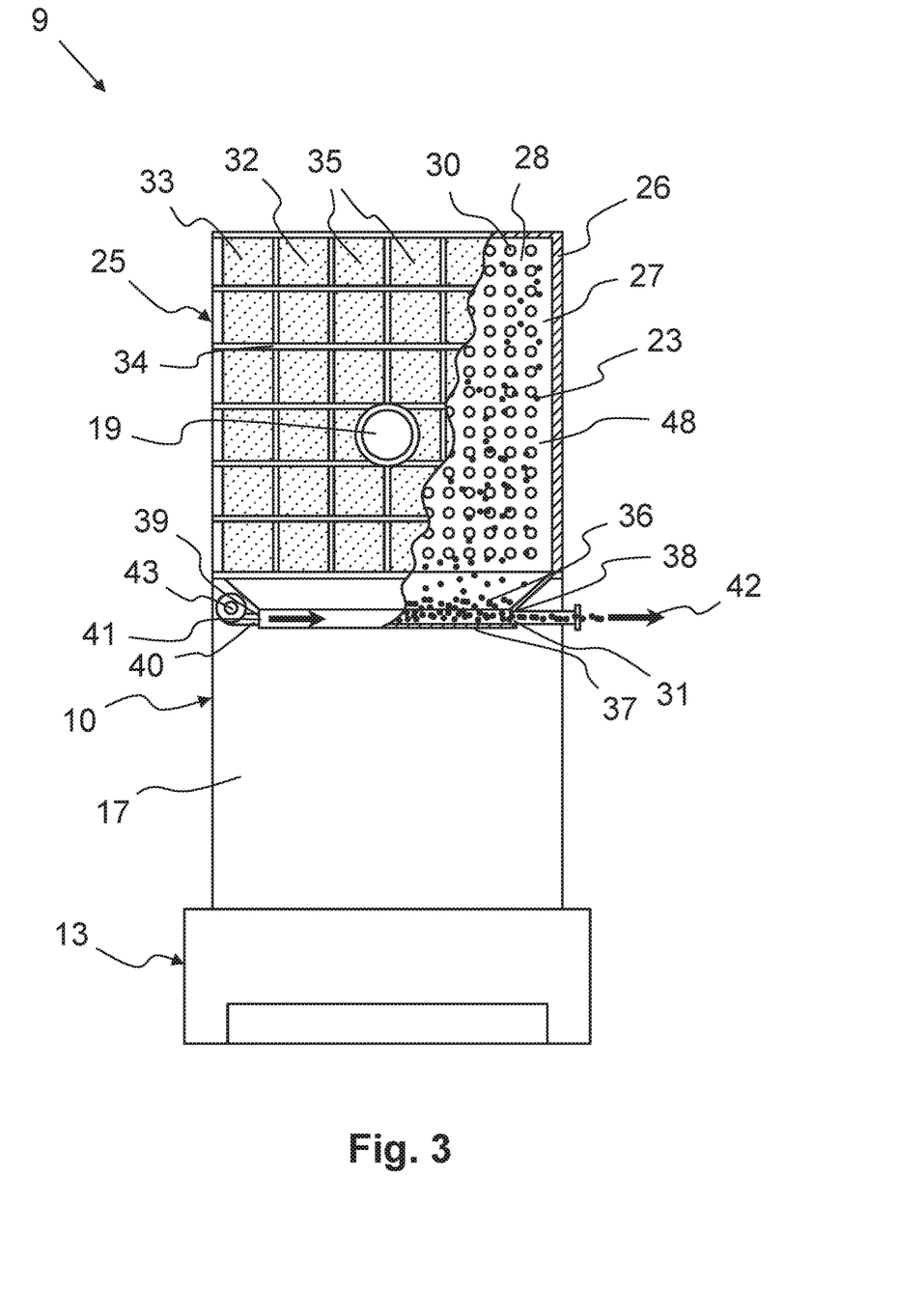
FIG. 3 shows a front view of the device according to the exemplary embodiment represented in FIG. 2*a* or 2*b*.

FIGS. 2*a*, 2*b* and 3 show a detailed view of a device 9, with the aid of which the fiber material 2 can be stored for the interim, prepared, and/or fed in a textile installation 1. As explained above, this device 9 can be utilized in a textile installation 1 of the type represented in FIG. 1 by way of example. In this case, the device 9 is a textile preparation device for web manufacturing.

According to FIGS. 2*a*, 2*b*, and 3 the device 9 comprises a storage device 10. The fiber material 2 can be stored for the interim in this storage device 10, in order to be able to cushion or buffer fluctuations in the supply of individual machines.

In addition to the storage device 10, the device 9 also comprises a processing unit 13. The processing unit 13 is situated beneath the storage device 10. With the aid of the processing unit 13, the fiber material 2 stored in the storage device 10 can be prepared, in particular, opened, and/or can be fed into a downstream machine, in particular, into a carding machine and/or a card. In this case, the processing unit 13 includes feed rollers 14, with the aid of which the fiber material 2 located in the storage chute 11 can be fed to a further device. The processing unit 13 also comprises at least one opening roller 15. The opening roller 15 is positioned downstream from the feed rollers 14. Moreover, the processing unit 13 comprises delivery rollers 16, with the aid of which the fiber material 2 can be drawn out of the device 9 and made available to a further device, in particular, a carding machine and/or a card.

As mentioned above, the storage device 10 represented in FIGS. 2a, 2b, and 3 comprises a storage chute 11. The storage chute 11 includes a chute housing 17. A storage chamber 18 is formed in the chute housing 17, in which the fiber material 2, which has been pneumatically conveyed into the storage device 10, can be stored for the interim. In this case, the fiber material 2 is introduced in an upper area of the storage chamber 18. Therein, the fiber material 2 whirls around together with the conveying air 21. The fibers 22 to be stored settle in a lower area of the storage chamber 18.

In order to be able to convey the fiber material 2 into the storage chamber 18, the storage chute 11 comprises at least one supply line 19 leading into the storage chamber 18. The at least one supply line 19 is operatively connected to a pneumatic conveying device 12 of the type represented in FIG. 1 by way of example. The fiber material 2 can therefore be pneumatically conveyed, with the aid of an appropriate conveying pressure, via the at least one supply line 19 into the storage chamber 18. FIG. 2a shows an exemplary embodiment comprising one single supply line 19 of this type. FIG. 2b shows an exemplary embodiment comprising two supply lines 19, 20. The two supply lines 19, 20 are situated on opposite sides of the storage chamber 18. Apart from the number of supply lines 19, 20, the exemplary embodiments represented in FIGS. 2a and 2b are essentially identical. The front view represented in FIG. 3 therefore relates to both of these exemplary embodiments.

The fiber material 2 is conveyed via the at least one supply line 19, 20 with the aid of conveying air 21 into the storage chamber 18. Thereby, the conveying air 21 is contaminated. Thus, the fiber material 2 comprises not only fibers 22, but contamination 23 as well. Before the conveying air 21 can be released into the surroundings 24, the contamination 23 has to be filtered out. The storage device 10 comprises a cleaning unit 25 for this purpose.

The cleaning unit 25 comprises a cleaning housing 26. A cleaning chamber 27 is formed in the cleaning housing 26. The storage chamber 18 of the storage chute 11, in particular its upper area, and the cleaning chamber 27 of the cleaning unit 25 are separated from one another via a dividing wall 28. With respect to a conveying air flow 29 indicated in this case by arrows, the dividing wall is therefore located between the storage chamber 18 and the cleaning chamber 27. The wall of the storage chamber 18 is designed to be impermeable in the lower area of the storage chute 11.

The dividing wall 28 is designed in such a way that it retains the fiber material 2, and the fibers 22 contained therein, in the storage chamber 18 and allows the conveying air 21 to flow, together with contamination 23 contained therein, into the cleaning chamber 27. The dividing wall 28 is therefore designed to be semipermeable. Preferably, the dividing wall 28 is designed as a perforated plate for this purpose. The dividing wall comprises a plurality of dividing wall holes 30, only one of which is provided with a reference sign, for the sake of clarity. The size of these dividing wall holes 30 is designed in such a way that the fibers 22 are retained, but the contamination 23, together with the conveying air 21, can pass through.

As is clear from FIGS. 2a and 2b, the chute housing 17 and the cleaning housing 26 are situated directly adjacent to one another. Consequently, the chute housing 17 and the cleaning housing 26 comprise a common side wall 48. At least one portion of this common side wall 48 forms the semipermeable dividing wall 28. In this case, the entire common side wall 48 is designed as the dividing wall 28.

According to the preceding description, the dividing wall 28 is therefore utilized for separating the fibers 22 from the contaminated conveying air 21. The fibers 22 therefore remain in the storage chamber 18 and, due to the force of gravity, accumulate in the lower area of the storage chute 11.

According to the conveying air flow 29 indicated in FIGS. 2a and 2b, the conveying air 21, together with its contamination 23, therefore passes through the dividing wall 28 into the cleaning chamber 27. In order to separate the contamination 23 from the conveying air 21, the cleaning unit 25 comprises a filter element 32. This filter element 32 is situated in the conveying air flow 29 between the cleaning chamber 27 and the surroundings 24. The filter element 32 is also designed to be semipermeable, namely in such a way that at least one portion of the contamination 23 contained in the conveying air flow 29 can be retained in the cleaning chamber 27, and the conveying air 21, which is now filtered by the filter element 32, can escape into the surroundings 24.

The filter element 32 is preferably a dry filter and/or an air filter. The filter element 32 can comprise, for example, fibers and/or grains. Moreover, the filter element 32 can comprise a paper-like and/or cloth-like woven fabric. The dividing wall 28 therefore performs a coarse screening function and the filter element 32 performs a fine filter function. It is advantageous when the material of the filter element 32 is a metal, a plastic, and/or a textile made, in particular, from natural or synthetic fibers. Preferably, the filter element 32 is formed from paper, a metal fabric, a metal mesh, and/or an, in particular, metallic plate including microholes. The term "microholes" is to be understood to mean holes, which can retain dust particles in the air and/or are smaller, in particular, by a multiple thereof, than the holes in the dividing wall 28 formed as a perforated plate.

As is clear from FIGS. 2a, 2b, and 3 the filter element 32 is situated on an outer wall 33 of the cleaning chamber 27 and/or of the cleaning housing 26. According to the present exemplary embodiment, the filter element 32 is situated on the outer wall 33 of the cleaning housing 26 opposite the dividing wall 28. The filter element 32 at least partially forms the outer wall 33. The filter element 32 is therefore designed as a filter wall and/or a filter outer wall, which preferably forms at least one portion of the housing wall of the cleaning housing 26. As a result, the filter element 32 can be easily cleaned by blowing a cleaning air flow through the filter element 32 from the outside. Contamination 23 fixed in the interior and/or on the inside of the filter element 32 can therefore be blown back into the cleaning chamber 27, and so the filter element 32 is cleaned out and the contamination 23 can settle, due to the force of gravity, in the lower area of the cleaning housing 26.

In order to support the filter element 32 with respect to the conveying air flow 29 and/or the opposed cleaning air flow, the cleaning housing 26 comprises a support grid 34 (cf., in particular, FIG. 3). The support grid 34 has a chessboard-like design. The filter element 32 can extend across the entire support grid 34. In this case, the filter element 32 is preferably clamped onto the support grid 34. Alternatively, the filter element 32 can even be designed in multiple parts, in particular, from a plurality of filter plates 35. Only a few of these filter plates 35 are provided with reference signs, for the sake of clarity.

According to FIGS. 2a, 2b, and 3, the cleaning housing 26 comprises not only the cleaning chamber 27, in the area of which the contamination 23 is filtered out with the aid of the filter element 32, but also a collection chamber 36. This collection chamber 36 is utilized for collecting the contamination 23 filtered out with the aid of the filter element 32, so that the contamination 23 can be subsequently disposed. For this purpose, the collection chamber 36 is situated at the bottom of the cleaning housing 26. Consequently, as represented in FIGS. 2a, 2b, and 3, the collection chamber 36 is located beneath the cleaning chamber 27, as shown in the figures. For this reason, the contamination 23 retained by the filter element 32 in the cleaning chamber 27 settles, due to the force of gravity, in the collection chamber 36.

In one exemplary embodiment, which is not represented here, at least one additional intermediate filter could be situated in the conveying air flow 29 between the dividing wall 28 and the filter element 32. The intermediate filter is preferably situated in the interior of the cleaning housing 26 in such a way that a first portion of the contamination 23 is retained by the intermediate filter, and a second portion of the contamination 23, which has passed through the intermediate filter, is retained by the filter element 32. Moreover, the intermediate filter is preferably designed and/or situated in such a way that the first portion as well as the second portion of the contamination 23 settle, due to the force of gravity, in the same collection chamber 36.

The collection chamber 36 is delimited, on the bottom side, from a collection chamber base 37. Moreover, the collection chamber 36 comprises multiple collection chamber walls 38, 39. In order to guide the contamination 23 with the aid of gravity down to the collection chamber base 37, it is advantageous when the collection chamber 36 according to FIGS. 2a, 2b, and 3 tapers in the shape of a funnel, at least in one section, in the direction of the collection chamber base 37.

As is clear, in particular, from FIG. 3, the cleaning unit 25 comprises a disposal opening 31. The disposal opening 31 is formed in the area of the collection chamber 36. Via the disposal opening 31 formed in the cleaning housing 26, the contamination 23, which has settled due to the force of gravity can be removed from the collection chamber 36. Preferably, the contamination 23 is conveyed, via the disposal opening 31, directly or indirectly via a pipe system into a waste container which is not represented here.

In order to remove the contamination 23 from the collection chamber 36 via the disposal opening 31, the cleaning unit 25 comprises a transport unit 40. According to the present exemplary embodiment, the transport unit 40 is designed as a pneumatic transport unit. For this purpose, the pneumatic transport unit 40 comprises at least one blow opening 41. Via this blow opening 41, a disposal air flow 42 can be blown into the collection chamber 36. The at least one blow opening 41 is preferably situated and/or designed in such a way that the disposal air flow 42 is oriented and/or directed in the direction of the disposal opening 31.

In order to generate the disposal air flow 42, the pneumatic transport unit 40 comprises a ventilator 43. With the aid of the ventilator 43, the disposal air flow 42 can therefore be generated, which is directed via the at least one blow opening 41 into the collection chamber 36 in such a way that contamination 23, which has settled on the collection chamber base 37 due to the force of gravity, can be removed from the collection chamber 36 via the disposal opening 31. The ventilator 43 is therefore designed, in particular, as a blower.

As is clear from FIGS. 2a and 2b, in particular, the at least one supply line 19, 20 extends from the outside through the cleaning chamber 27 into the storage chamber 18. Moreover, the storage device 10 comprises two cleaning units 25, 44. The second cleaning unit 44 is also designed according to the preceding description, wherein the aforementioned features can be present individually or in any combination. Moreover, the storage device 10 comprises a second dividing wall 45, with the aid of which the second cleaning unit 44 is separated from the common storage chamber 18.

In the case of the device 9 represented in FIGS. 2a, 2b, and 3, fiber material 2 is transported into the storage chamber 18, in particular, is blown therein, by a pneumatic conveying device 12 of the type shown, for example, in the textile installation 1 represented in FIG. 1, via the at least one supply line 19. The fiber material 2 comprises contamination 23 in addition to the fibers 22. Due to the force of gravity, the fibers 22 settle in the lower area of the storage chute 11. In the upper area of the storage chute 11, the conveying air 21 enters the cleaning chamber 27 via the dividing wall 28 according to the conveying air flow 29 indicated by arrows. In this case, the conveying air 21 carries the contamination 23 along, whereas the fibers 22 are retained in the storage chamber 18 by the dividing wall 28.

Via the filter element 32, the conveying air 21 escapes into the surroundings 24. The blowing energy of the pneumatic conveying device 12, which is not represented here, is utilized in this case. The filter element 32 retains the contamination 23 in the cleaning chamber 27. The contamination 23 retained in the cleaning chamber 27 settles, due to the force of gravity, in the collection chamber 36 of the cleaning unit 25.

The contamination 23 now located in the collection chamber 36 is blown out of the disposal opening 31 via the pneumatic transport unit 40 with the disposal air flow 42 represented in FIG. 3. Advantageously, the cleaning unit 25 can therefore be operated highly cost-effectively and economically, since a very large volume of air can already escape through the filter element 32 into the surroundings 24. Consequently, by comparison, only a much smaller volume of air needs to be moved by the transport unit 40 out of the disposal opening 31.

Figure 4:
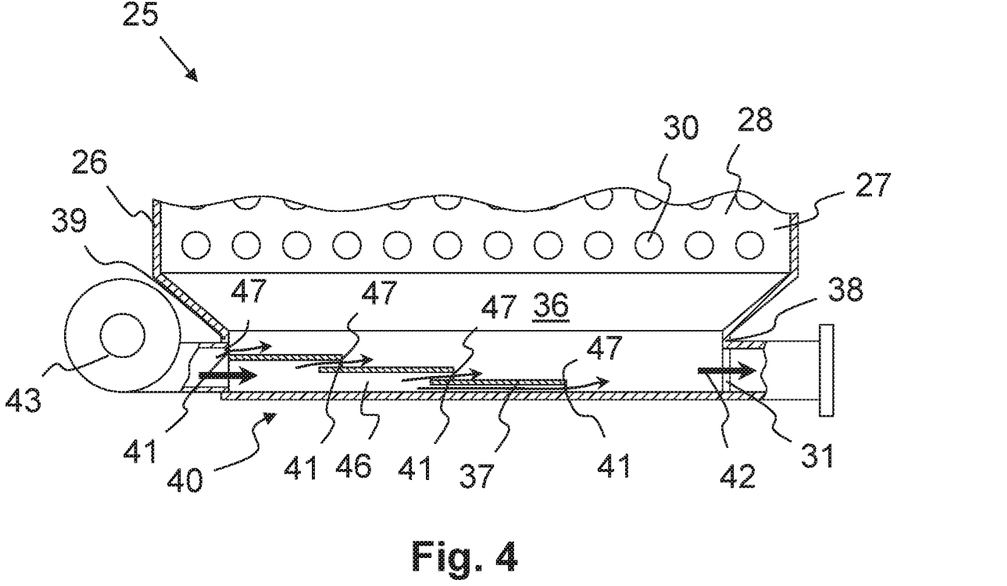
FIG. 4 shows a detailed view of the cleaning unit of the device represented in FIGS. 2*a*, 2*b*, and 3 in the area of a pneumatic transport unit according to a first exemplary embodiment.
Figure 5:
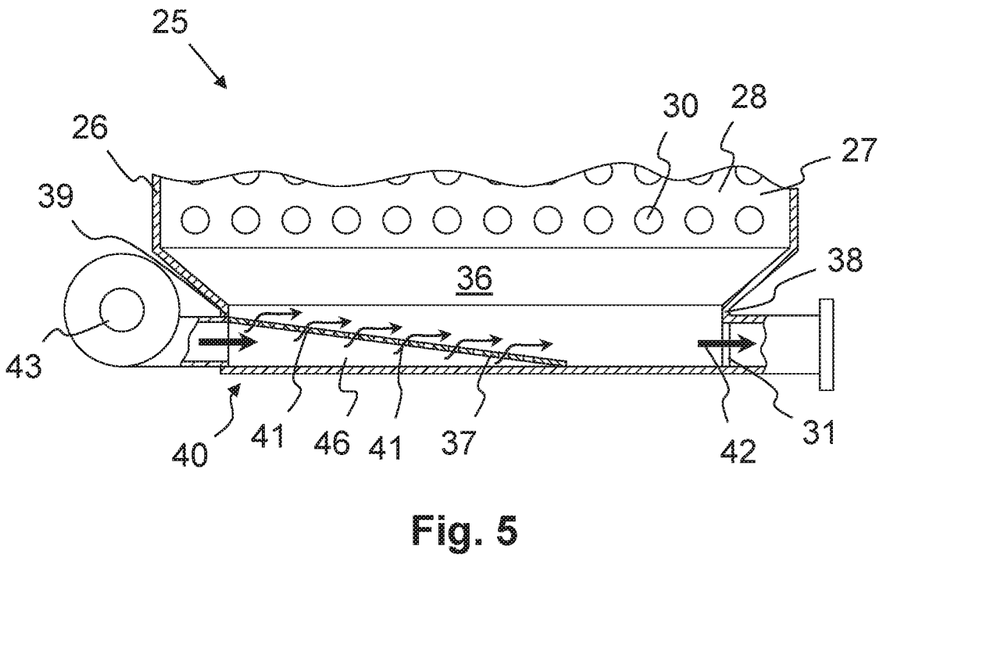
FIG. 5 shows a detailed view of the cleaning unit of the device represented in FIGS. 2*a*, 2*b*, and 3 in the area of a pneumatic transport unit according to a second exemplary embodiment.

FIGS. 4 and 5 show a detailed view of two different embodiments for the arrangement of the at least one blow opening 41. In both exemplary embodiments, the disposal opening 31 is located on a first collection chamber wall 38. The ventilator 43 enters the collection chamber 36 via a second collection chamber wall 39 positioned opposite the first collection chamber wall 38. In both exemplary embodiments, the cleaning unit 25 comprises an air supply chamber 46. The air supply chamber 46 is formed on the back side of the collection chamber base 37, in particular, between the cleaning housing 26 and the collection chamber base 37. The ventilator 43 is operatively connected to the blow openings 41 via this air supply chamber 46. Multiple blow openings 41 are formed in the collection chamber base 37 in the exemplary embodiment represented in FIG. 4 and in the exemplary embodiment represented in FIG. 5. The blow openings 41 establish an operative connection between the back-side air supply chamber 46 and the front-side collection chamber 36.

According to the exemplary embodiment represented in FIG. 4, the collection chamber base 37 has a stepped design. Thus, the collection chamber base 37 comprises multiple steps 47. The stepped collection chamber base 37 drops in the direction of the disposal opening 31. At least one blow opening 41 is situated on the end faces of the particular steps 37. The blow openings 41 point in the direction of the disposal opening 31. As a result, the disposal air flow 42 can be guided directly in the direction of the disposal opening 31.

Alternatively, the collection chamber base 37 can extend obliquely and/or drop toward the disposal opening 31. By way of the oblique position as well, the disposal air flow 42 can be directed in the direction of the disposal opening 31. In this case, the collection chamber base 37 is preferably designed as a perforated plate, wherein the holes in the perforated plate form the particular blow openings 41.

The features of the collection chamber base 37 represented in FIGS. 4 and 5 could also be combined. Thus, the collection chamber base 37 could comprise steps in one section and/or could be slanted in this section or in another section. The stepped design of the collection chamber base 37 could also be made from at least one perforated plate.

In one alternative embodiment, which is not represented here, the transport unit 40 can even be designed as a mechanical transport unit, wherein the transport unit 40 then preferably comprises a motor-driven conveyor belt, which preferably forms at least one portion of the collection chamber base 37. The conveyor belt is situated with respect to the disposal opening 31 in such a way that the contamination can be transported out of the disposal opening 31 via the conveyor belt.

The present invention is not limited to the represented and described exemplary embodiments. Modifications within the scope of the claims are also possible, as is any combination of the features, even if they are represented and described in different exemplary embodiments.

LIST OF REFERENCE SIGNS 1 textile installation
2 fiber material
3 bale opener
4 mixing opener
5 pipeline
6 fine opener
7 feeding chute feeder
8 carding machine
9 device for preparation
10 storage device
11 storage chute
12 pneumatic conveying device
13 processing unit
14 feed roller
15 opening roller
16 delivery roller
17 chute housing
18 storage chamber
19 first supply line
20 second supply line
21 conveying air
22 fibers
23 contamination
24 surroundings
25 first cleaning unit
26 cleaning housing
27 cleaning chamber
28 first dividing wall
29 conveying air flow
30 dividing wall holes
31 disposal opening
32 filter element
33 outer wall
34 support grid
35 filter plate
36 collection chamber
37 collection chamber base
38 first collection chamber wall
39 second collection chamber wall
40 transport unit
41 blow opening
42 disposal air flow
43 ventilator
44 second cleaning unit
45 second dividing wall
46 air supply chamber
47 step
48 common side wall

The invention claimed is:

1. A storage device for a device for preparing and/or feeding fiber material, the storage device comprising:
   a storage chute for interim storage of the fiber material, the storage chute comprising a chute housing that defines a storage chamber, and a supply line leading into the storage chamber via which the fiber material is pneumatically conveyed with aid of conveying air into the storage chamber;
   a cleaning unit situated in the storage chamber to clean contamination from the conveying air, the cleaning unit comprising a cleaning housing that defines a cleaning chamber;
   a semipermeable dividing wall situated in a flow of the conveying air between the storage chamber and the cleaning chamber to retain the fiber material in the storage chamber and allow the contaminated conveying air to flow into the cleaning chamber;
   the cleaning unit comprising a filter element situated in the conveying air flow between the cleaning chamber and outer surroundings, via which the contamination in the conveying air is retained in the cleaning chamber and filtered conveying air escapes into the surroundings;
   the cleaning housing defining, at a bottom thereof, a collection chamber situated underneath the cleaning chamber, wherein the contamination retained by the filter element in the cleaning chamber settles, due to gravity, in the collection chamber;
   wherein the cleaning unit comprises a pneumatic transport unit that removes the contamination from the collection chamber via a disposal opening;
   wherein the pneumatic transport unit comprises at least one blow opening via which a disposal air flow is introduced into the collection chamber; and
   wherein the blow opening is located on a second collection chamber wall and includes blow openings in a collection chamber base of the collection chamber.

2. The storage device as in claim 1, wherein the collection chamber base is slanted or extends obliquely toward the disposal opening at least in one section.

3. The storage device as in claim 1, wherein the collection chamber base is formed, at least in one section, from a perforated plate comprising a plurality of the blow openings.

4. The storage device as in claim 1, wherein the collection chamber base comprises at least one step oriented towards the disposal opening, at least one of the blow openings formed in the step.

5. The storage device as in claim 1, wherein the pneumatic transport unit comprises a ventilator that generates the disposal air flow and is connected to the blow openings via an air supply chamber formed on a back side of the second collection chamber wall or on a back side of the collection chamber base.

6. The storage device as in claim 1, wherein the dividing wall comprises a perforated plate and forms at least one portion of a common side wall of the chute housing and the cleaning housing.

7. The storage device as in claim 1, wherein the filter element is situated on or at least partially forms an outer wall of the cleaning housing opposite the dividing wall.

8. The storage device as in claim 1, comprising at least two of the cleaning units situated symmetrically or opposite one another, each of the cleaning units separated from the storage chamber by a separate one of the dividing walls.

9. A device for preparing or feeding fiber material for a textile installation, comprising:
   a storage device for interim storage of the fiber material, wherein the storage device comprises the storage device according to claim 1.

* * * * *